United States Patent [19]

Hsu

[11] Patent Number: 5,211,041
[45] Date of Patent: May 18, 1993

[54] AUTOMOBILE STEERING LOCK
[75] Inventor: Lih-Tsai Hsu, Tainan, Taiwan
[73] Assignee: Kuo Kuang Industrial Co., Ltd., Tainan, Taiwan
[21] Appl. No.: 965,992
[22] Filed: Oct. 23, 1992
[51] Int. Cl.⁵ .......................................... B60R 25/02
[52] U.S. Cl. ........................................ 70/209; 70/226
[58] Field of Search ................. 70/209, 211, 212, 225, 70/226, 237, 238

[56] References Cited
U.S. PATENT DOCUMENTS

| | | | |
|---|---|---|---|
| 1,277,113 | 8/1918 | Petersen | 70/226 X |
| 1,481,815 | 1/1924 | Tino | 70/237 |
| 4,494,391 | 1/1985 | Solow | 70/237 X |
| 4,738,127 | 4/1988 | Johnson | 70/209 |
| 4,887,443 | 12/1989 | Wang | 70/209 |
| 4,935,047 | 6/1990 | Wu | 70/209 |
| 5,005,388 | 4/1991 | Lo | 70/209 |
| 5,042,278 | 8/1991 | Wang | 70/226 X |
| 5,099,664 | 3/1992 | Wen-Yin | 70/209 |
| 5,113,672 | 5/1992 | Wang | 70/209 |
| 5,121,617 | 6/1992 | Chen | 70/209 |

Primary Examiner—Lloyd A. Gall
Attorney, Agent, or Firm—Pro-Techtor International

[57] ABSTRACT

An automobile steering lock having a tubular member having a central passageway for a hexagonal rod member to telescope freely therein, a first hook secured to the tubular member and second hook secured to the rod member for engagement with opposite portions of a steering wheel, a locking member having an oval actuator extending from a key hole body to fit in a round hole in a flat body of a locating means to push up and down a locating means having two parallel feet with V-shaped ends to engage two of many grooves provided in the rod member to lock it within the tubular member at a variety of positions.

4 Claims, 4 Drawing Sheets

AUTOMOBILE STEERING LOCK

BACKGROUND OF THE INVENTION

Many automobile steering locks are known, such as U.S. Pat. Nos. 5,099,664, 5,005,388, 4,935,047, 4,887,443, 5,042,278, 4,738,127, etc., which generally comprise one or two elongate rod members and a locking member locked on the rod member(s). The patent of U.S. Pat. No. 5,099,664 comprises a curved locating means engaging a rod member. The patent of U.S. Pat. No. 5,005,388 comprises two locating means engaging a rod member. Those of U.S. Pat. Nos. 4,935,047 and 4,887,443 have a single locating means to engage a rod member. As for the patents of U.S. Pat. Nos. 4,103,544, 3,462,982, 4,738,127, though they generally function well with key locks attached thereto, the movement stopping structure of a key lock against a rod member has not been improved. Most key locks have a bearing of semi-circular shape for stopping the rod member, and this bearing can be broken by a vertical edge pry tool inserted between two annular grooves of the rod member. When a stroke is repeatedly applied on the steering lock with great force the bearing is broken and can be moved out of the steering lock along the hollow space between the annular grooves. Thus, numerous cars are still stolen by destroying steering locks as well as by illegal opening of locks.

Those steering locks of U.S. Pat. Nos. 3,462,982, 4,738,127 have only one outer end extending out of a steering wheel for preventing it from rotating, thus still leaving some opportunity for rotation.

SUMMARY OF THE INVENTION

An object of this invention is to supply an automobile steering lock, which has a rod member movable to a proper length in spite of the lock being in a locked position, and preventable from complete separation from a tubular member.

One feature of this invention is that a locking member has an eccentric oval actuator extending from a bottom surface of a key hole body to directly move up a locating means to unlock this lock.

Another feature of this invention is that a locating means has a flat body provided with a round hole in its center and two parallel feet extending from an inner side and each foot has a declined face at the right and a vertical face at the left to engage any of grooves in the rod member for locking and unlocking this lock, and besides, it does not need a key to lock it.

One more feature is that the rod member is provided with an annular groove near its outer end for a stop ring to fit around to prevent the rod member from wholly separating from a tubular member.

DETAILED DESCRIPTION OF THE INVENTION

Figure 1:
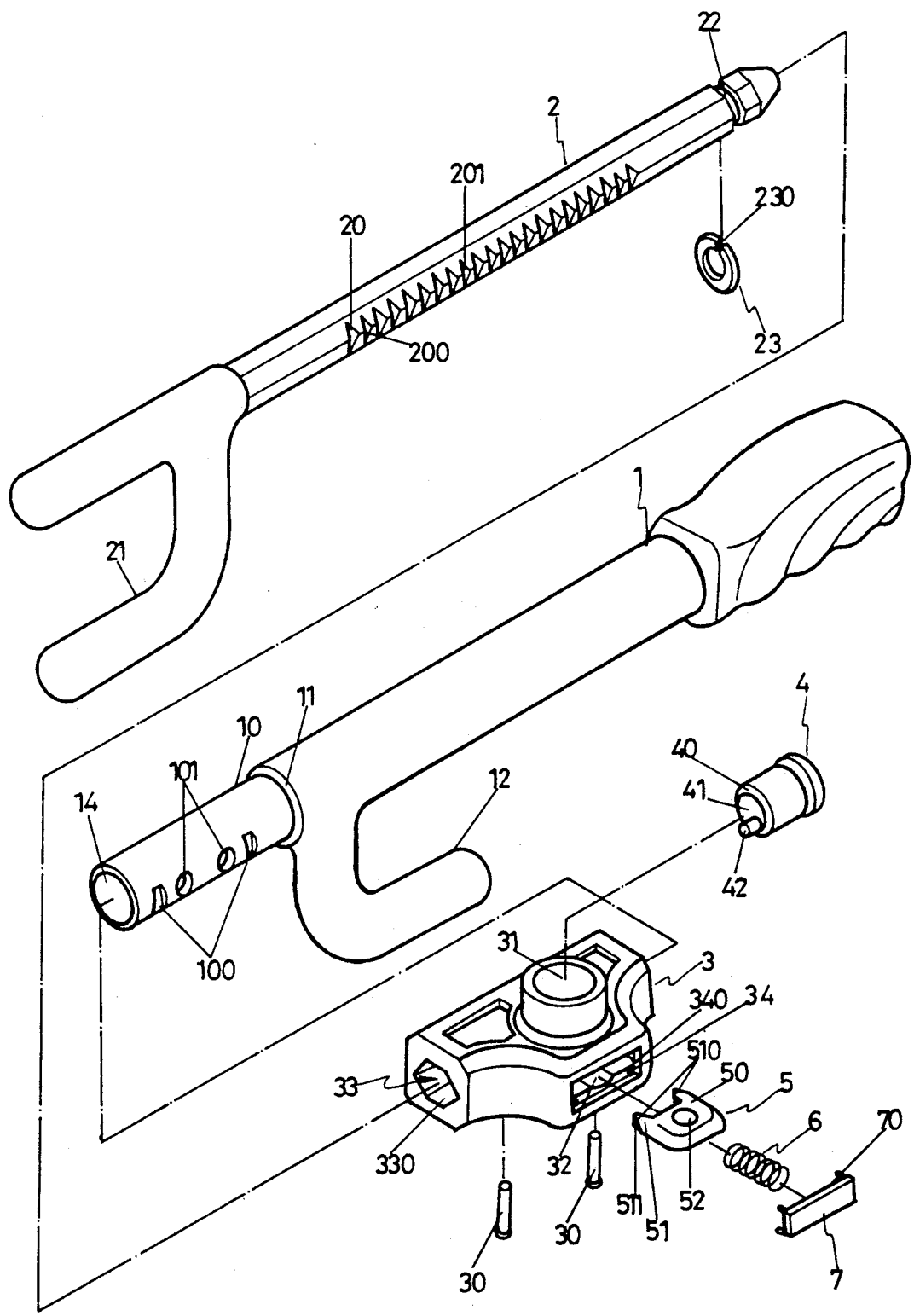
FIG. 1 is an exploded perspective view of an automobile steering lock in the present invention.
Figure 2:
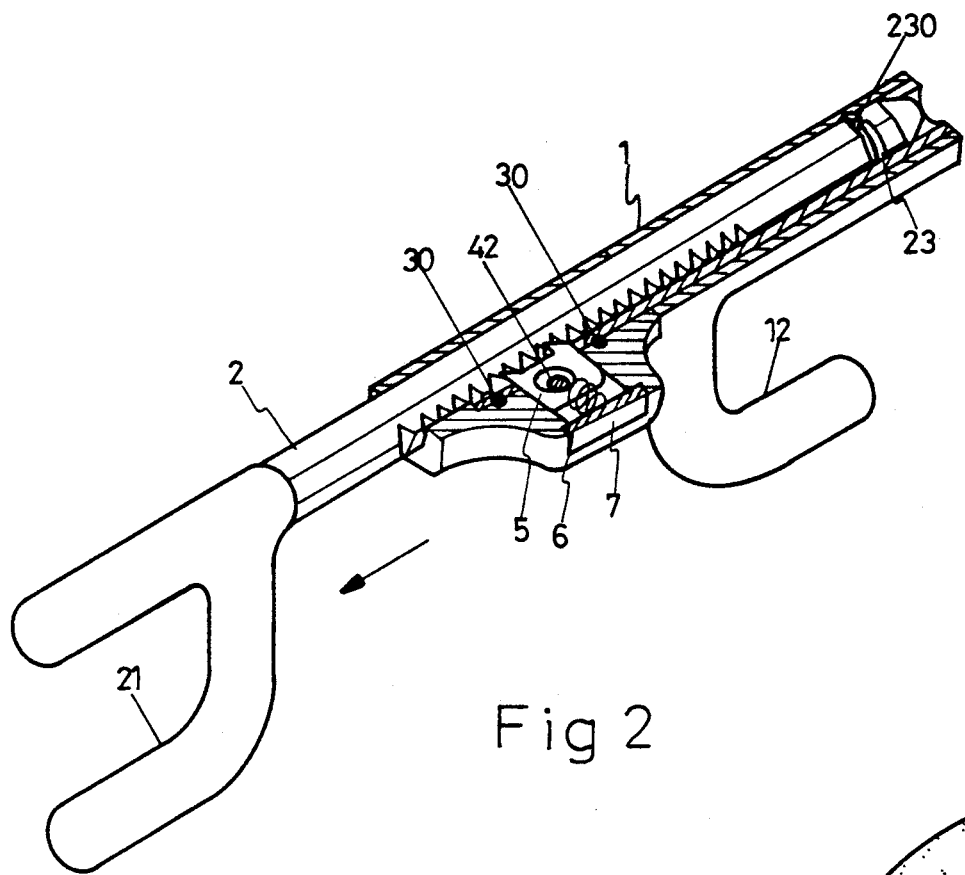
FIG. 2 is a cross-sectional perspective view of the automobile steering lock in the present invention.
Figure 3:
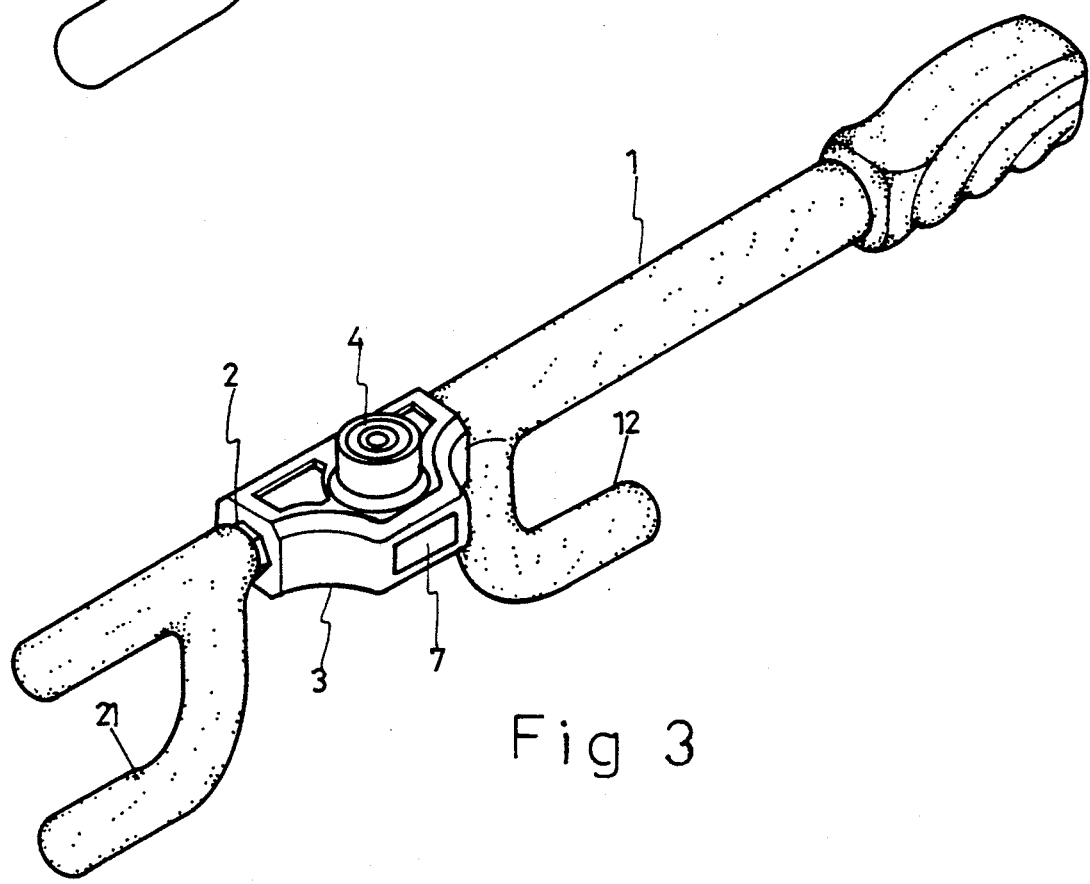
FIG. 3 is a perspective view of the automobile steering lock in the present invention.
Figure 4:
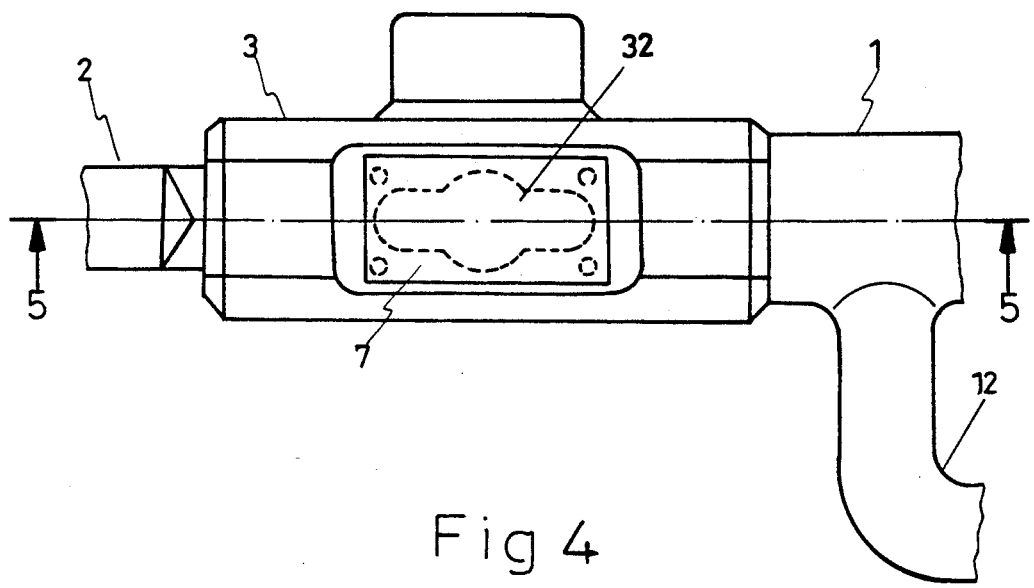
FIG. 4 is a partial upside view of the automobile steering lock in the present invention.

An automobile steering lock in the present invention, as shown in FIG. 1, comprises an elongate tubular member 1, and elongate rod member 2, a lock housing 3, a locking member 4, and a locating means 5 as main components.

Figure 5:
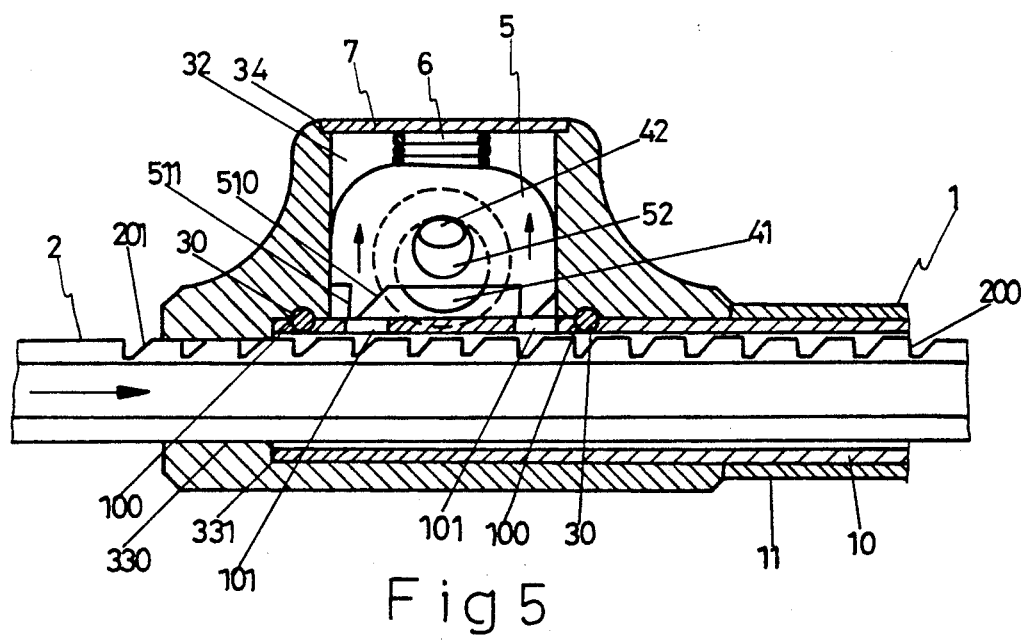
FIG. 5 is a cross-sectional view of line 5—5 in FIG. 4, showing a locking member in unlocked condition.
Figure 6:
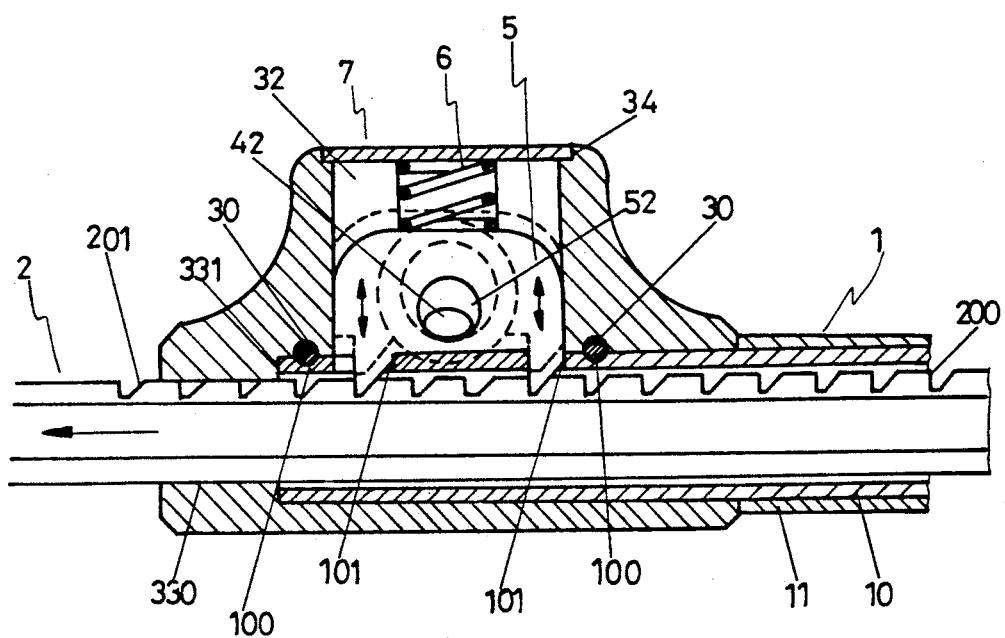
FIG. 6 is a cross-sectional view of line 5—5 in FIG. 4, showing the locking member in locked condition.

The elongate tubular member 1 has a round tube 10 enveloped with plastics 11, a central passageway axially running through in the member 1 for the elongate rod member 2 to telescope freely therein, and a first hook 12 is fixed near the lock housing 3 on the tubular member with its opening facing to the right to engage one of opposed portions of a steering wheel. An inner end thereof is provided with two pin holes 100 and two locating means holes 101 arranged in a line for two pins 30 and two feet ends 51 of the locating means 5 to fit therein so as to keep the lock housing 3 from moving or rotating freely as shown in FIGS. 5 and 6. At the same time, the two feet 51 of the locating means 5 can also move to fit in two of grooves 20 in the rod member 2.

The elongate rod member 2 is shaped hexagonal and has a second hook 21 at its outer end to engage the other of opposed portions of generally a steering wheel, and a plurality of generally V-shaped grooves 20 are provided in an axially spaced longitudinal series along the rod member 2. Each groove 20 has a V-shape consisting of a vertical face 200 and a declined face 201 as shown in FIGS. 5 and 6 so that the rod member 2 can be easily telescoped outward in the tubular member 1 to a proper length needed in locking his lock on a steering wheel even with the locking member 4 in locked position. In addition, an annular groove 22 is provided near an inner end of the rod member 2 for a slotted stop ring 23 to fit around. The stop ring 23 can be stopped by a hexagonal opening wall 331 in the lock housing 3, preventing the rod member 2 from wholly separating from the tubular member 1, as shown in FIGS. 5 and 6.

The lock housing 3 is combined fixedly with the inner end portion of the tubular member 1, provided with a locking member hole 31 for fixing the locking member 4, a locating means hole 32 vertical to and communicating with the lock member hole 31 for the locating means 5 to move therein up and down in a definite route, a rod passageway 33 with an hexagonal opening 330 vertical to the locating means hole 32 for the inner end of the rod member 2 to fit through so as to guide the rod member 2 to move therein in a definite route. The locating means hole 32 has a rectangular outer edge 34 and four small holes 340 in four corners for four feet 70 of the cap 7 to fit therein. The lock housing 3 is kept secured in place by means of two pins 30 passing through the housing 3 from underside to fit fixedly in two holes 101 in the round tube 10.

The locking member 4 has a lock cylinder 40 embracing a key hole body 41 having at its bottom an eccentric oval actuator 42 as shown in FIGS. 1, 5 and 6. The oval actuator 42 inserts in a round hole 52 in the locating means 5.

The locating means 5 is shaped as a flat plate, having a flat body 50, two parallel feet 51 extending horizontally from an inner side of the flat body 50 and each of the feet 51 having a declined face 510 at its right side and a vertical face 511 at the left side so that after the locating means 5 is made to fit in two of the grooves 20 in the rod member 2, it is not necessary to move the locating means 5 with a key to lock this lock. In other words, this lock can be automatically locked without using a key.

A coil spring 6 is provided between the flat body 50 of the locating means and the cap 7 to always push the locating means 5 resiliently.

What is claimed is:

1. An automobile steering lock for attachment to the steering wheel of an automobile comprising;

an elongate tubular member made of a round tube, having a first hook with its opening facing to the right, its outer surface enveloped with plastics, a central passageway extending axially in the tube for said elongate rod member to telescope freely therein, and an inner end portion fixed with a lock housing;

said elongate rod member having a generally hexagonal cross-section having a second hook with its opening facing to the left, a plurality of generally V-shaped grooves provided axially in longitudinal series, each groove consisting of a vertical face and a declined face;

said lock housing having a locking member hole for fixing a locking member therein, a locating means hole provided vertical both to the locking member hole and to a central passageway having a hexagonal opening, a rectangular opening on the locating means hole and four small holes at four corners of said rectangular opening for four feet of a rectangular cap to fit therein; and said locking member having a key hole body provided with an eccentric oval actuator at its bottom, said actuator fitting in a round hole in a flat body of a locating means having two parallel feet extending from an inner side, each said foot having a declined face at the right and a vertical face at the left, a coil spring provided between an outer side of said flat body and said rectangular cap, said actuator of the key hole body being rotated by a key to allow movement of the locating means so that its two feet move down to engage two of the grooves in said rod member to lock this lock.

2. The automobile steering lock as claimed in claim 1, wherein said actuator of the key hole body on the locking member has an oval shape.

3. The automobile steering lock as claimed in claim 1, wherein said flat body of said locating means has a flat face to contact with the coil spring.

4. The automobile steering lock as claimed in claim 1, said flat body of said locating means has said round hole in the center for said actuator to fit therein.

* * * * *